(12) United States Patent
Semba et al.

(10) Patent No.: US 7,359,534 B2
(45) Date of Patent: Apr. 15, 2008

(54) DEVICE AND METHOD FOR FINGERPRINT IDENTIFICATION, AND COMPUTER PRODUCT

(75) Inventors: Satoshi Semba, Kawasaki (JP); Yusaku Fujii, Kawasaki (JP); Yukihiro Abiko, Kawasaki (JP); Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 11/109,765

(22) Filed: Apr. 20, 2005

(65) Prior Publication Data
US 2005/0185828 A1 Aug. 25, 2005

Related U.S. Application Data

(63) Continuation of application No. PCT/JP03/05374, filed on Apr. 25, 2003.

(51) Int. Cl.
*G06K 9/00* (2006.01)
(52) U.S. Cl. ...................................... 382/124
(58) Field of Classification Search ..................... None
See application file for complete search history.

(56) References Cited

U.S. PATENT DOCUMENTS

| | | | | |
|---|---|---|---|---|
| 5,917,928 | A * | 6/1999 | Shpuntov et al. | 382/124 |
| 5,982,913 | A | 11/1999 | Brumbley et al. | 382/124 |
| 6,393,139 | B1 * | 5/2002 | Lin et al. | 382/124 |
| 6,434,259 | B1 * | 8/2002 | Hamid et al. | 382/115 |
| 2003/0126448 | A1 * | 7/2003 | Russo | 713/186 |
| 2005/0147282 | A1 * | 7/2005 | Fujii | 382/124 |

FOREIGN PATENT DOCUMENTS

| | | |
|---|---|---|
| EP | 1 239 404 | 9/2002 |
| JP | 10-143663 | 5/1998 |
| JP | 10-187982 | 7/1998 |
| WO | WO 01/80167 | 10/2001 |
| WO | WO 03/069542 | 8/2003 |

OTHER PUBLICATIONS

Supplementary European Search Report, mailed Mar. 21, 2007 and issued in corresponding European Patent Application No. 03719215.0-1224.

* cited by examiner

*Primary Examiner*—Matthew C. Bella
*Assistant Examiner*—Alex Liew
(74) *Attorney, Agent, or Firm*—Staas & Halsey LLP

(57) ABSTRACT

In a method for fingerprint identification, fingerprint images of parts of one finger of a person to be registered are registered as registered fingerprint images, and a relative position is calculated. A fingerprint image of a person to be identified is acquired as a read fingerprint image. Based on the relative position, a registered fingerprint image from among the registered fingerprint images is specified, and a matching degree between the registered fingerprint image specified and the read fingerprint image is calculated. The specifying and the calculating are executed until the matching degree is greater than a predetermined value.

10 Claims, 13 Drawing Sheets

DEVICE AND METHOD FOR FINGERPRINT IDENTIFICATION, AND COMPUTER PRODUCT

This application is a continuing application, filed under 35 U.S.C. 111(a), of International Application PCT/JP03/05374, filed Apr. 25, 2003.

BACKGROUND OF THE INVENTION

1) Field of the Invention

The present invention relates to a device and method for fingerprint identification, and a computer product that are capable of being installed in portable terminals such as a PDA (Personal Digital Assistant), a cellular phone, a PHS (Personal Handyphone System) terminal, a compact notebook-type personal computer, and the like.

2) Description of the Related Art

Conventionally, fingerprint identification devices are used to identify a person using his/her fingerprint as an image that is read by an image sensor. More specifically, at first, an image sensor reads a fingerprint of a person to be identified, and then an image of the fingerprint read is registered as a fingerprint image.

To actually identify a fingerprint, the image sensor reads the fingerprint of the person to be identified, and a matching degree is checked between the fingerprint image and a fingerprint image previously registered. If the matching degree is equal to or more than a threshold value, then the identity of the person is authenticated.

A pattern matching method is often used to calculate the matching degree between the two fingerprint images. The pattern matching method is generally used in the field of image processing. For example, assuming that $I(x, y)$ represents a read fingerprint image of a person to be identified, and $T(x, y)$ represents a registered fingerprint image previously registered, an evaluation value $v(x, y)$ is obtained by the following expression.

$$v(x, y)=(1/A)\Sigma\Sigma I(i, j)T(i-x, j-y) \quad (1)$$

where A is the overlapping area between $I(i, j)$ and $T(i-x, j-y)$. Coordinates $(x, y)$ where v is the maximum indicate a position where the read fingerprint image and the registered fingerprint image match each other to the maximum extent, and the value at that time represents the matching degree.

If the read fingerprint image and the registered fingerprint image are binary images of white and black, $I(x, y)$ and $T(x, y)$ take the value of 0 or 1. The evaluation value at this time may be obtained by the expression (1) given above, or by the following expression (2). As explained above, the expression used to perform a correlation operation is not limited thereto, but has various forms.

$$v(x, y)=(1/A)\Sigma\Sigma not(I(i, j) \; xor \; T(i-x, j-y)) \quad (2)$$

where "xor" represents an exclusive OR, and "not" represents negative, and A is the overlapping area between $I(i, j)$ and $T(i-x, j-y)$.

However, the pattern matching method used in the conventional fingerprint identification device has one significant problem. This is the overlapping area between the read fingerprint image and the registered fingerprint image.

In the expression (1) and the expression (2), a factor A corresponds to the area of the overlap. To calculate an accurate matching degree, the area needs to be divided by the factor A to normalize it. However, if the area of the overlap is small, the factor A as a denominator reduces, which causes the value of matching degree to be inaccurate. In order to obtain an accurate value, the area of the overlap is required to be about a half of the fingerprint image. Therefore, to obtain the larger area of the overlap, it is effective to use an image sensor having large area. Basically, by using an image sensor larger than the area of a finger, the overlap occupies most part of the image, and the problem does not occur.

However, recently, requirements for installing the fingerprint identification device in portable terminals such as PDA, cellular phone, PHS, compact notebook-type personal computer, and the like are significantly increasing.

This is because the functions of the portable terminal have become extremely advanced, and the information stored therein has increased, thereby increasing the risk of losing the information stored.

However, in these portable terminals, it is difficult to install an image sensor whose size is larger than a finger (larger than 10 mm square) rather than restriction to installation space. Particularly, in cellular phones and PDAs, an image sensor having the area of about a fraction of a finger can be installed. In the image sensor having such small area, it is extremely difficult to exhibit sufficient performance, and therefore, it is impossible to perform fingerprint identification with high accuracy.

A conventional art has been disclosed, for example, in Japanese Patent Application Laid-Open No. H10-187982.

SUMMARY OF THE INVENTION

It is an object of the invention to at least solve the problems in the conventional technology.

According to an aspect of the present invention, a fingerprint identification device includes a relative position calculating unit that calculates a relative position for each of registered fingerprint images, each of which is registered for each of a plurality of parts of one finger of a person; a image acquiring unit that acquires an image of a part of a finger of a person to be identified, as a read fingerprint image; a specifying unit that specifies a registered fingerprint image from among the registered fingerprint images, based on the relative position; a matching degree calculating unit that calculates a matching degree between the read fingerprint image and the registered fingerprint image specified; and an authenticating unit that authenticates a fingerprint if the matching degree is greater than a predetermined value.

According to another aspect of the present invention, a method of fingerprint identification includes registering a fingerprint image, as registered fingerprint images, for each of a plurality of parts of one finger of a person; calculating a relative position for each of the registered fingerprint images; acquiring an image of a part of a finger of a person to be identified, as a read fingerprint image; specifying a registered fingerprint image from among the registered fingerprint images, based on the relative position; calculating a matching degree between the registered fingerprint image specified and the read fingerprint image; executing the specifying and the calculating until the matching degree is greater than a predetermined value.

According to still another aspect of the present invention, a computer-readable recording medium stores therein a computer program that implements the above method on a computer.

The other objects, features, and advantages of the present invention are specifically set forth in or will become apparent from the following detailed description of the invention when read in conjunction with the accompanying drawings.

DETAILED DESCRIPTION

Figure 1:
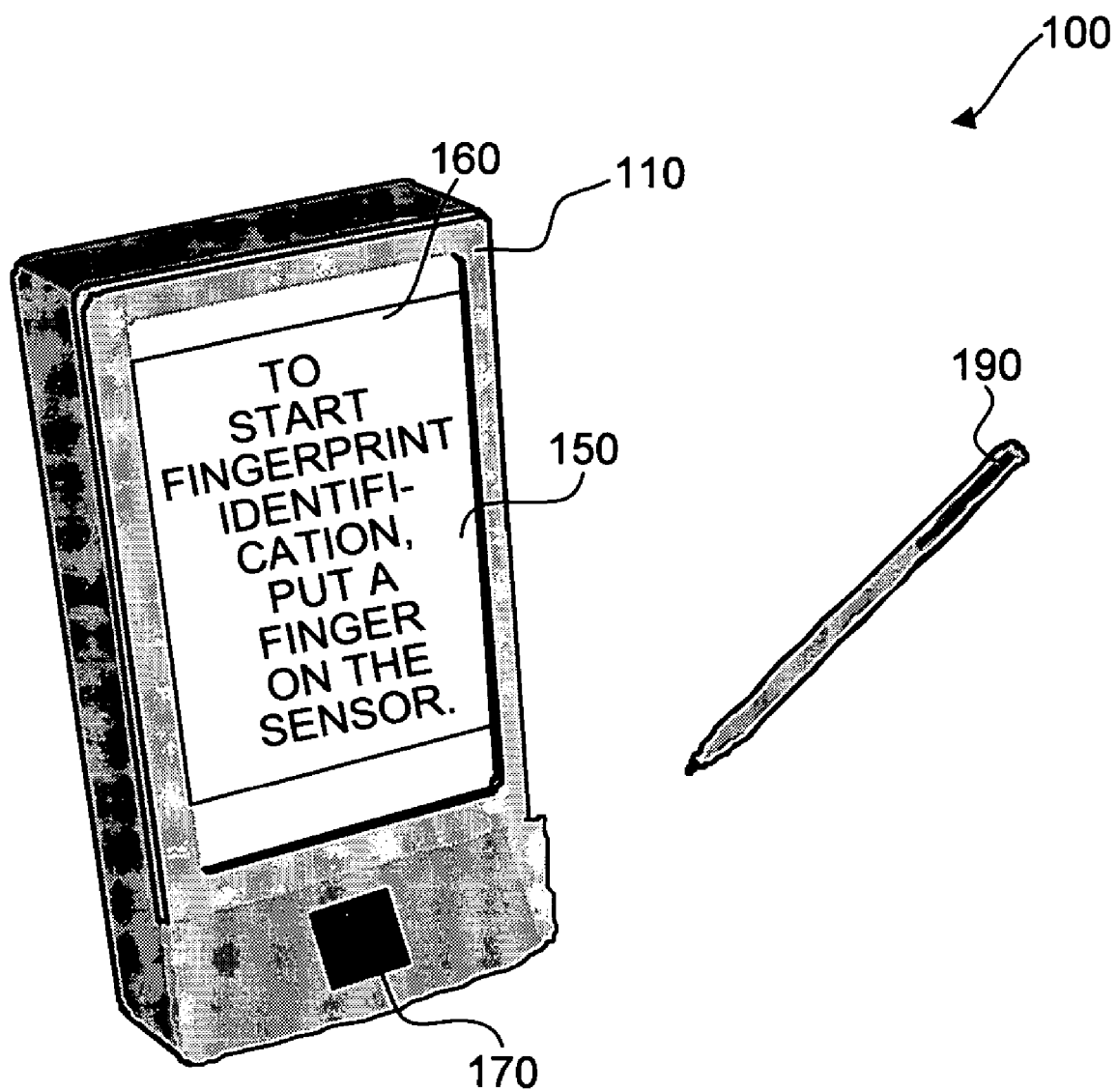
FIG. 1 is a perspective view of an exterior of a portable terminal, to which a fingerprint identification device according to the present invention is applied.
Figure 2:
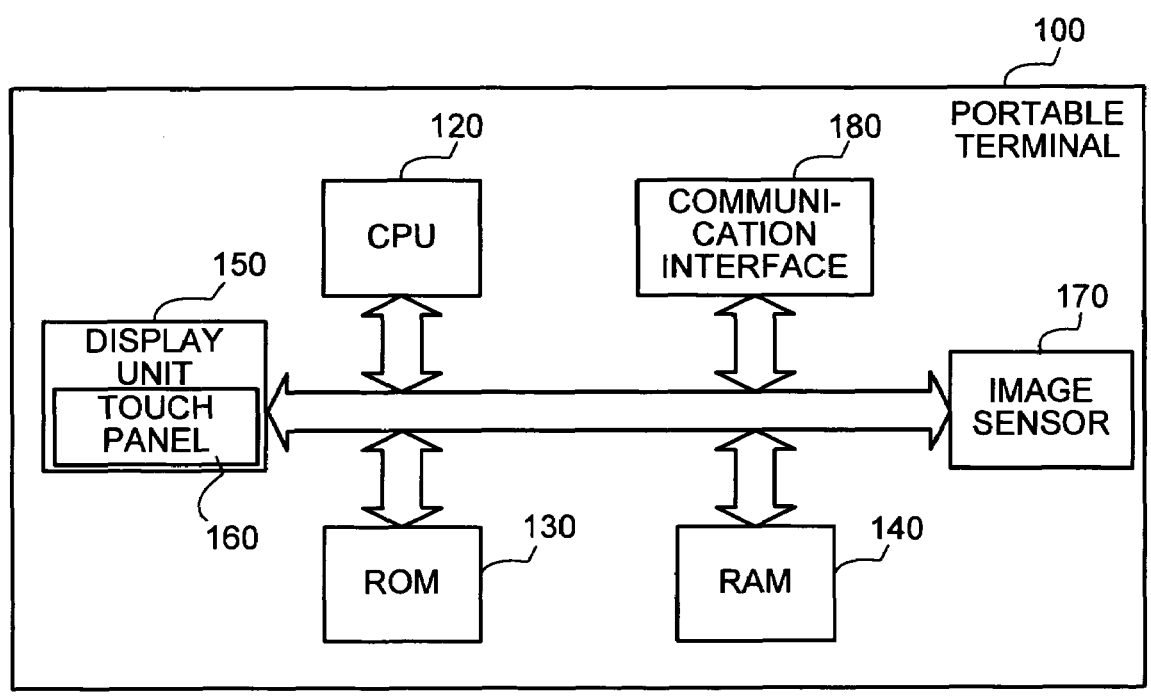
FIG. 2 is a block diagram of an electrical configuration of the portable terminal shown in FIG. 1.

Exemplary embodiments of the present invention are explained in detail below with reference to the accompanying drawings. FIG. 1 is a perspective view of an exterior of a portable terminal 100 to which a fingerprint identification device according to one embodiment of the present invention is applied. FIG. 2 is a block diagram of an electrical configuration of the portable terminal 100 shown in FIG. 1.

In these figures, the portable terminal 100 includes an information processing function and a communication function, and further includes a fingerprint registration function, a fingerprint comparison function, and a fingerprint re-registration function, etc. A housing 110 shown in FIG. 1 includes a display unit 150 and an image sensor 170. The display unit 150 is a liquid crystal display for displaying various types of information. A touch panel 160 adheres to the display unit 150. A stylus 190 is used to touch the touch panel 160, and input a character and so on, like a keyboard.

The image sensor 170 reads a fingerprint image, and has an area that is smaller than the area of a fingerprint portion of a finger, for example, 3 mm square to 10 mm square. Therefore, only a part of a fingerprint can be read in one reading by the image sensor 170.

As shown in FIG. 2, a CPU (central processing unit) 120 executes a computer program stored in a ROM (read-only memory) 130 to realize the information processing function, the communication function, the fingerprint registration function, the fingerprint comparison function, and the fingerprint re-registration function, etc.

Figure 3:
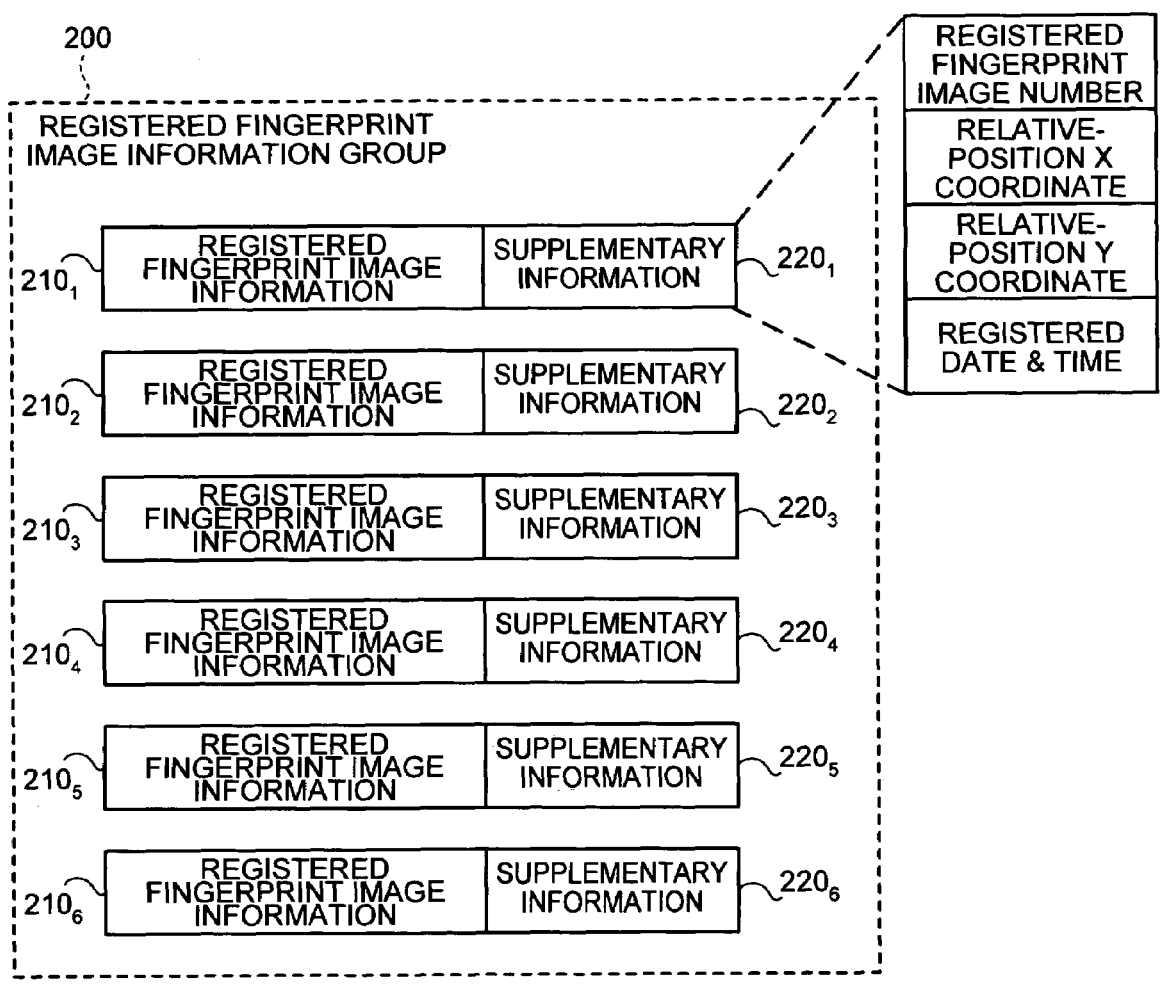
FIG. 3 is a diagram of a registered fingerprint image information group that is registered in a RAM shown in FIG. 2.

The ROM 130 stores the computer program and various types of data. A RAM (random access memory) 140 is a rewritable memory. In addition to the various types of data, a registered fingerprint image information group 200 as shown in FIG. 3 is registered in the RAM 140.

Figure 4:
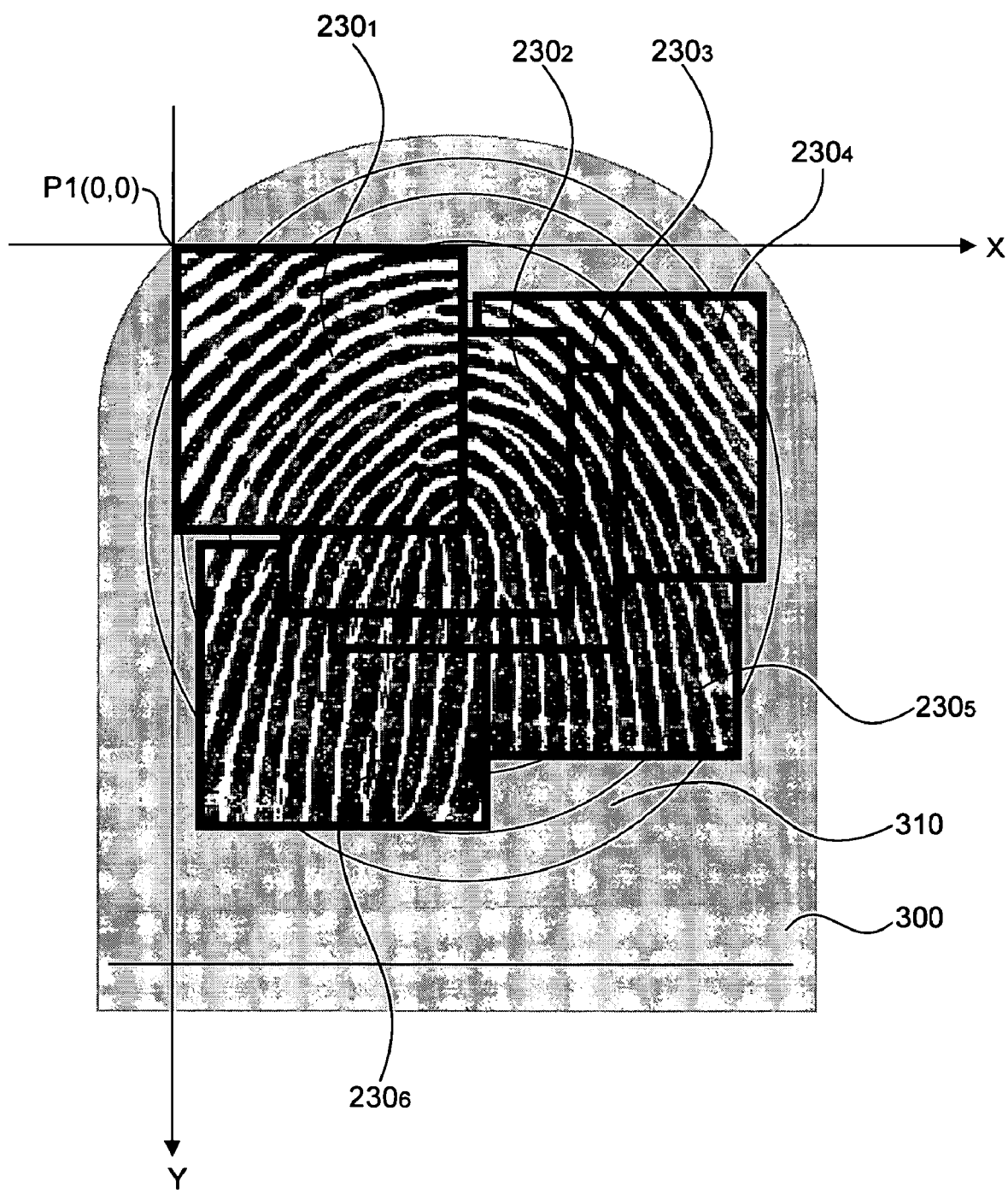
FIG. 4 is a diagram of a relative positional relation between various fingerprint images.

As shown in FIG. 4, the registered fingerprint image information group 200 corresponds to six registered fingerprint images $230_1$ to $230_6$ (images of various parts of the fingerprint) that are read by the image sensor 170 six times and registered. The registered fingerprint image information group 200 includes registered fingerprint image information $210_1$ to $210_6$, and supplementary information $220_1$ to $220_6$.

The registered fingerprint image information $210_1$ to $210_6$ are fingerprint image information corresponding to the registered fingerprint images $230_1$ to $230_6$ of six parts of a fingerprint 310 of a finger 300 as shown in FIG. 4, and are read by the image sensor 170. These registered fingerprint images $230_1$ to $230_6$ cover almost entire of the fingerprint 310 of the finger 300, and overlap one another.

The supplementary information $220_1$ to $220_6$ are correlated to the registered fingerprint image information $210_1$ to $210_6$, respectively, and each of them includes information such as a registered fingerprint image number, a relative-position X coordinate, a relative-position Y coordinate, and a registered date & time.

The registered fingerprint image number is a unique number assigned to the registered fingerprint image information (registered fingerprint image). The relative-position X coordinate and the relative-position Y coordinate are X coordinate and Y coordinate assuming that in the registered fingerprint images $230_1$ to $230_6$, for example, a left upper point P1(0, 0) of the registered fingerprint image $230_1$, which is read first, is an origin. The X coordinate and the Y coordinate represent a relative position between the left upper point P1 and a left upper point of another registered fingerprint image. The registered date & time indicates a date & time on which the registered fingerprint image information is registered in the RAM 140.

Referring back to FIG. 2, a communication interface 180 is an interface connected to a network (not shown) based on a predetermined communication protocol, and is used to perform communication with another portable terminal and the like.

Operating principles of one embodiment are explained below with reference to FIG. 5 to FIG. 9.

Figure 5:
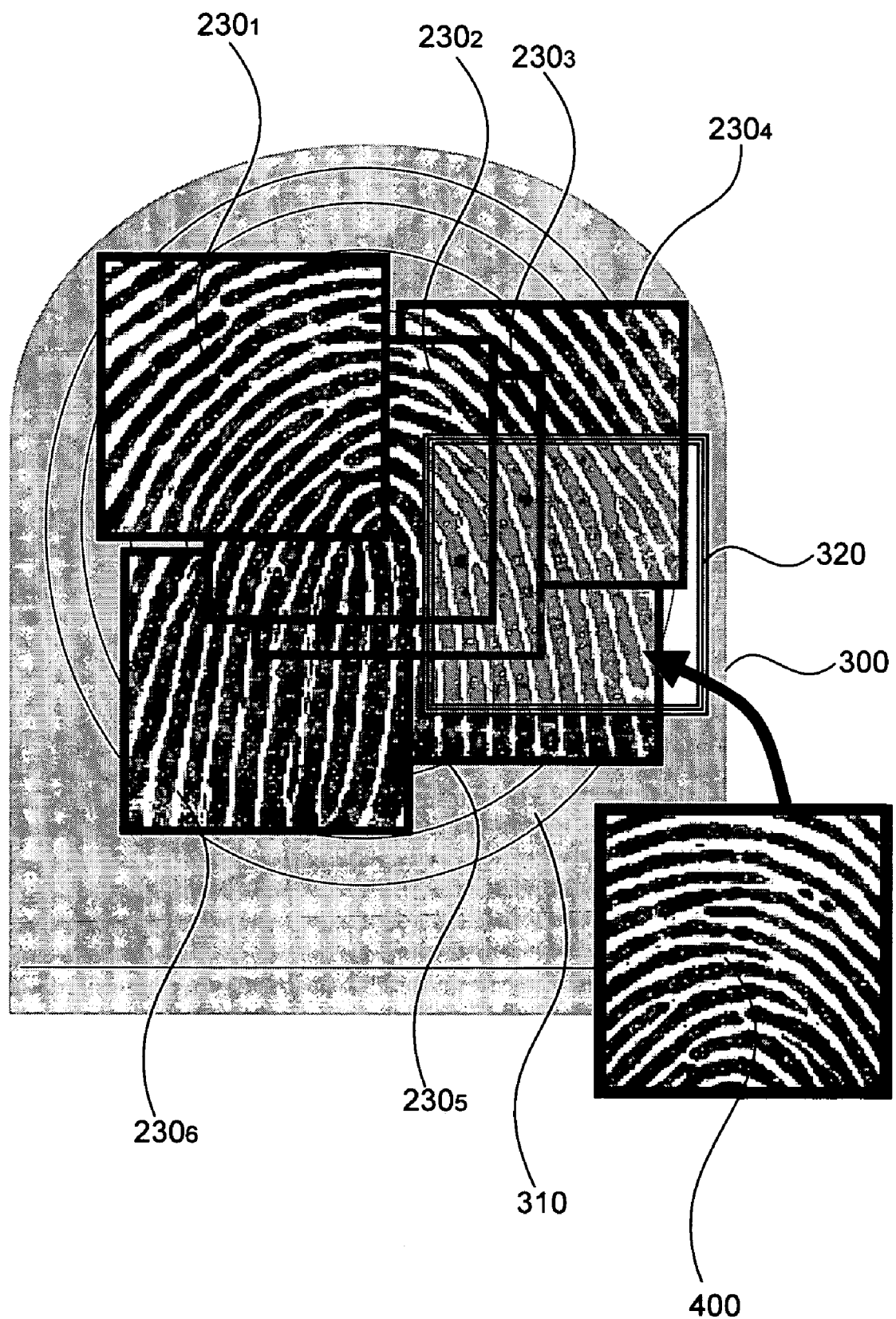
FIG. 5 is a diagram for explaining a fingerprint comparison process.

First, upon identification of a fingerprint, the image sensor 170 (see FIG. 1 and FIG. 2) reads a part of the fingerprint of a person to be identified as a read fingerprint image 400, as shown in FIG. 5.

In this case, the read fingerprint image 400 is assumed to correspond to a part 320 of the finger 300. A registered fingerprint image $230_5$, having the broadest area of an overlap with the part 320, is selected from the registered fingerprint images $230_1$ to $230_6$. Then, the value of matching degree is calculated, between the registered fingerprint image $230_5$ and the read fingerprint image 400.

Thereafter, the part 320 is shifted little by little by a predetermined distance, so as to cover the whole area throughout the fingerprint 310 of the finger 300 (area obtained by slightly increasing an area of the registered fingerprint images $230_1$ to $230_6$), and the values of matching degree are calculated each time. Of all these values, the highest value of the matching degree being is regarded as the final value of matching degree.

Such a search method allows the amount of calculation to be largely reduced as compared with a case where values of matching degree between the registered fingerprint images and the read fingerprint images are calculated in a "round robin" manner.

Figure 6:
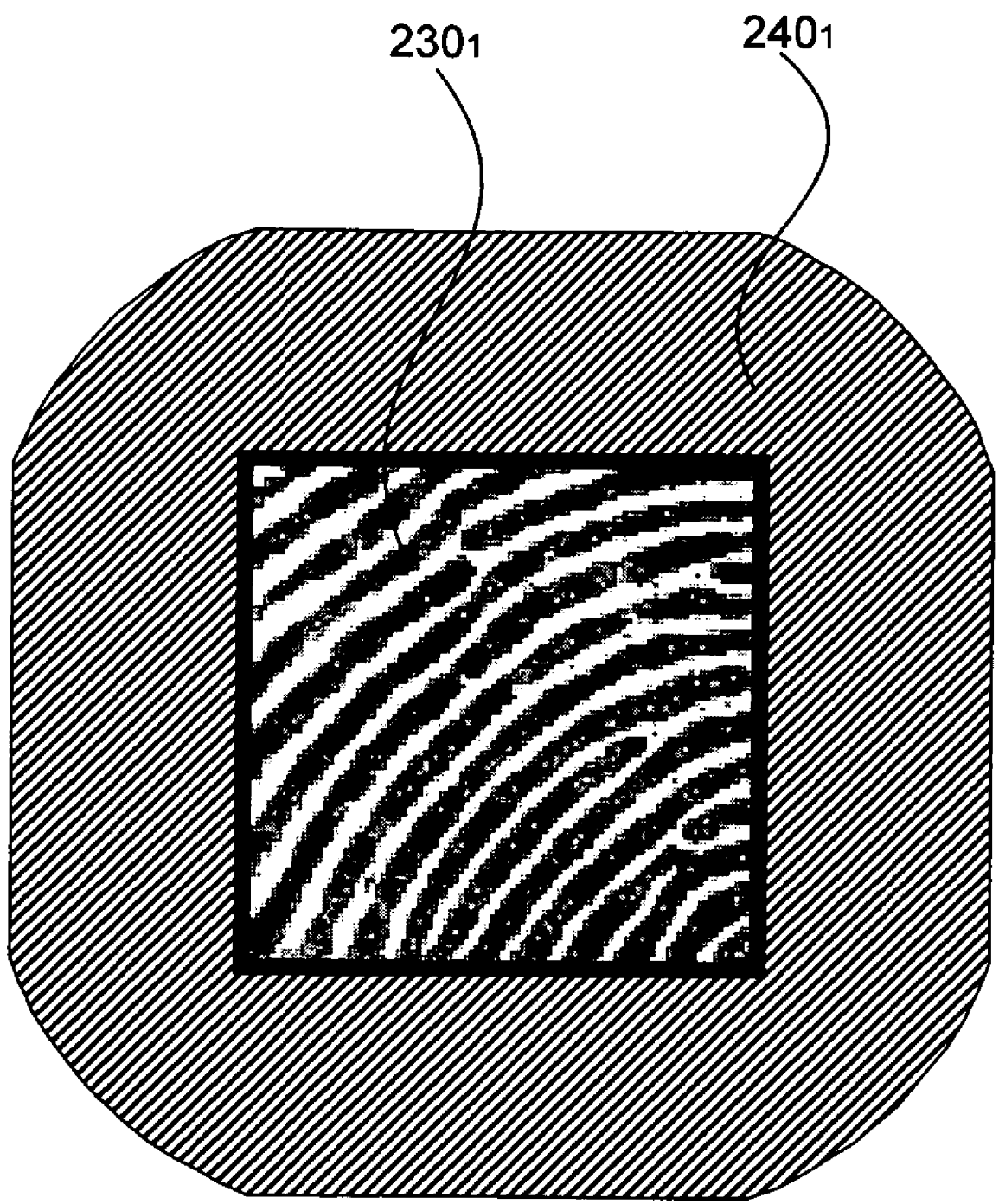
FIG. 6 is a diagram of one search area.

That is, a range of a margin slightly increased with respect to the registered fingerprint image is assumed as a range of which a half of the area can be shared by the read fingerprint image and the registered fingerprint image. If so, as shown in FIG. 6, a search area of the maximum value of matching degree for one registered fingerprint image includes the registered fingerprint image $230_1$ and a diagonally shaded area $240_1$. The whole search area (the registered fingerprint images $230_1$ to $230_6$ and diagonally shaded areas $240_1$ to $240_6$) is shown in FIG. 7.

Assume here that the registered fingerprint image $230_1$ of FIG. 6 consists of 96 pixels square. The diagonally shaded area $240_1$ is assumed to have 23904 pixels. Therefore, the search area (the registered fingerprint image $230_1$ and the diagonally shaded area $240_1$) consists of 33120 pixels.

Figure 7:
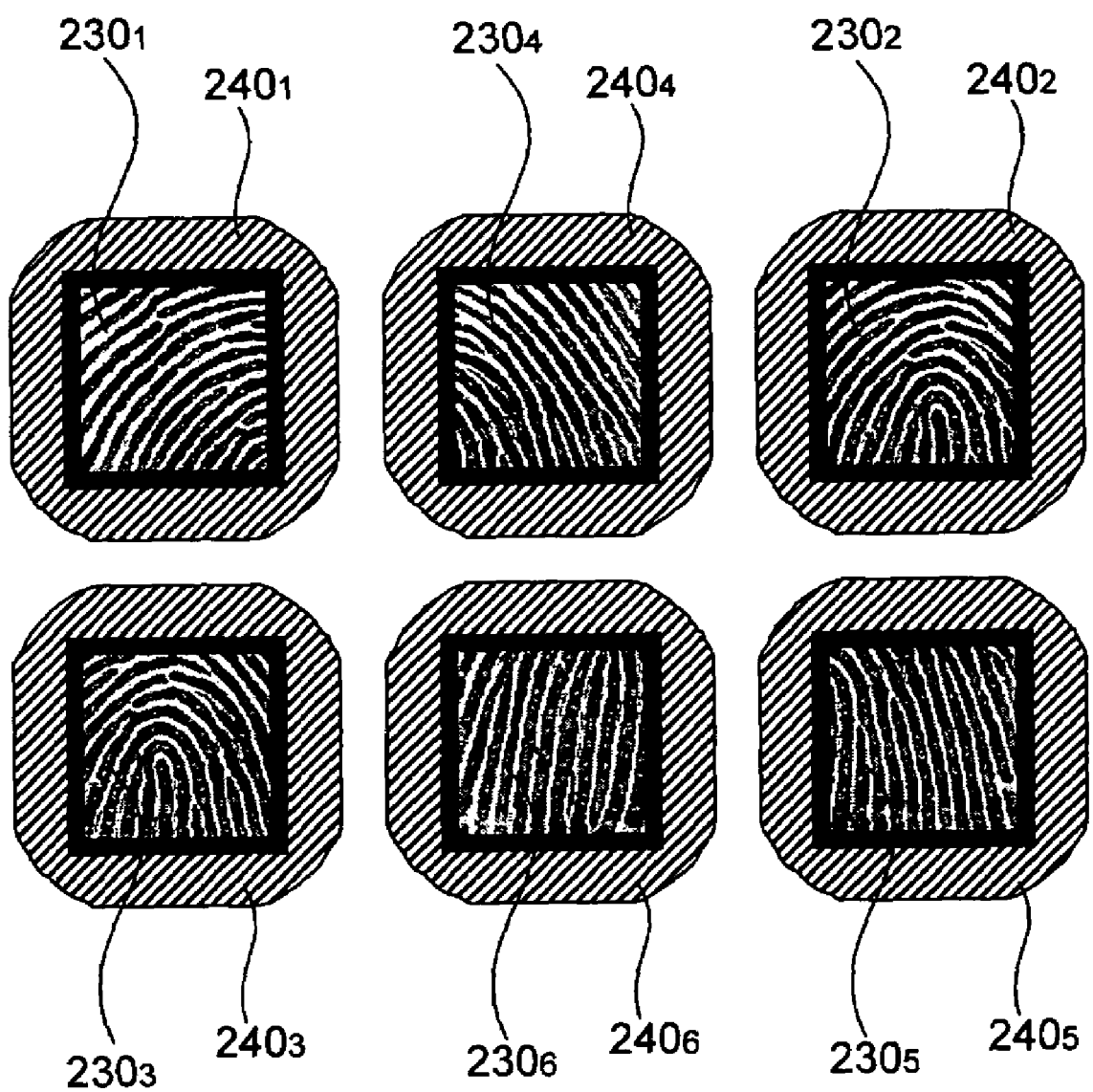
FIG. 7 is a diagram of a whole search area.

When the six registered fingerprint images $230_1$ to $230_6$ as shown in FIG. 7 are used, the number of pixels of the whole search area (total of search areas) is 198720 (33120×6) pixels.

Figure 8:
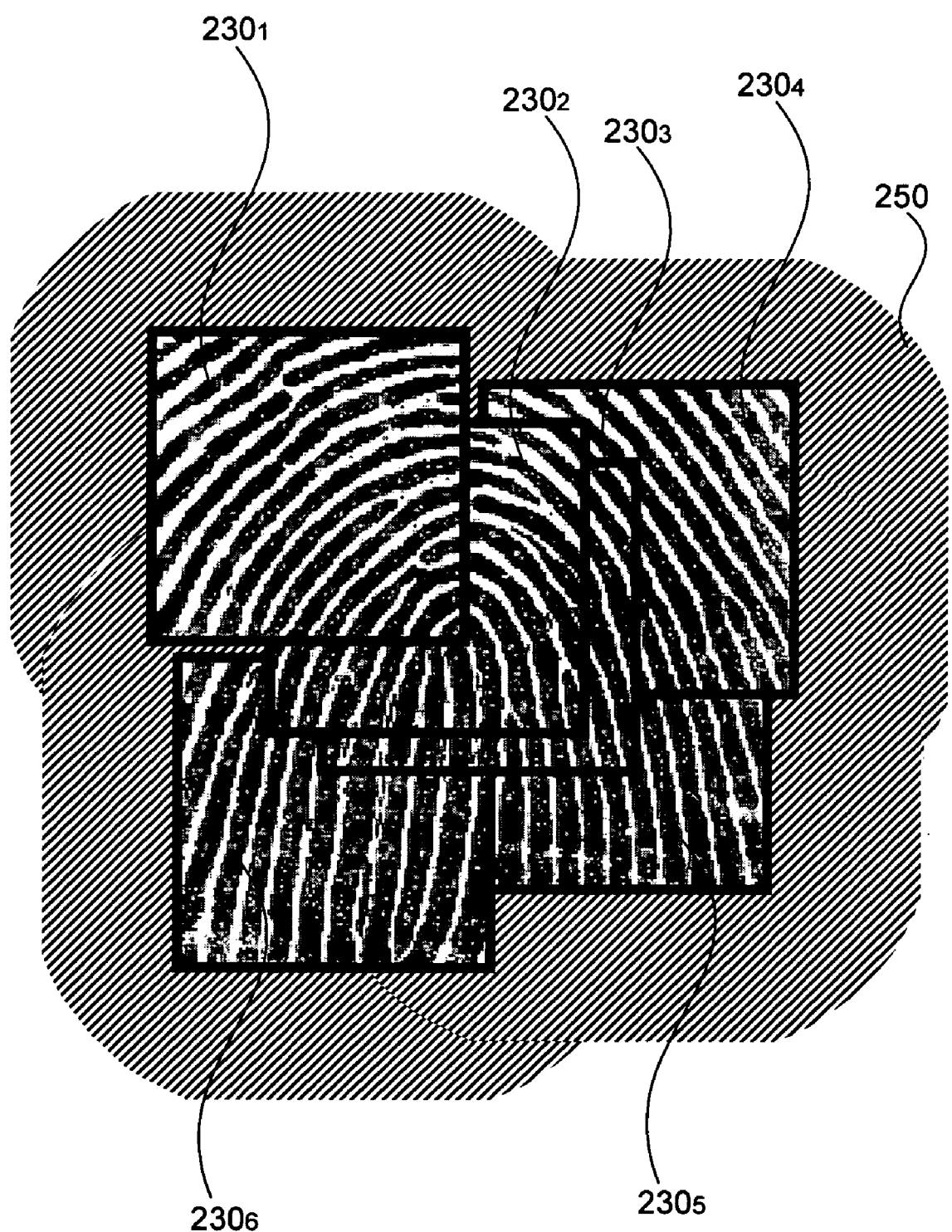
FIG. 8 is a diagram of the whole search area.

On the other hand, the whole search area in the search method as explained with reference to FIG. 5 indicates the registered fingerprint images $230_1$ to $230_6$ in the overlapping state and a diagonally shaded area 250 around, as shown in FIG. 8. Therefore, this whole search area is less than the whole search area of FIG. 7.

More specifically, the diagonally shaded area 250 shown in FIG. 8 has 42583 pixels. The registered fingerprint images $230_1$ to $230_6$ in the overlapping state have 34655 pixels. In other words, the whole search area as shown in FIG. 8 has 77238 (42583+34655) pixels, which is a half or less than the whole search area (198720 pixels) of FIG. 7.

Therefore, the search method of the present invention allows reduction in the amount of calculation, because the area to be searched can be largely reduced.

In one embodiment, if the read fingerprint image is verified with a high matching degree, a fingerprint re-registration process is executed, in which an unnecessary registered fingerprint image is deleted and the read fingerprint image is re-registered as a new registered fingerprint image.

Figure 9:
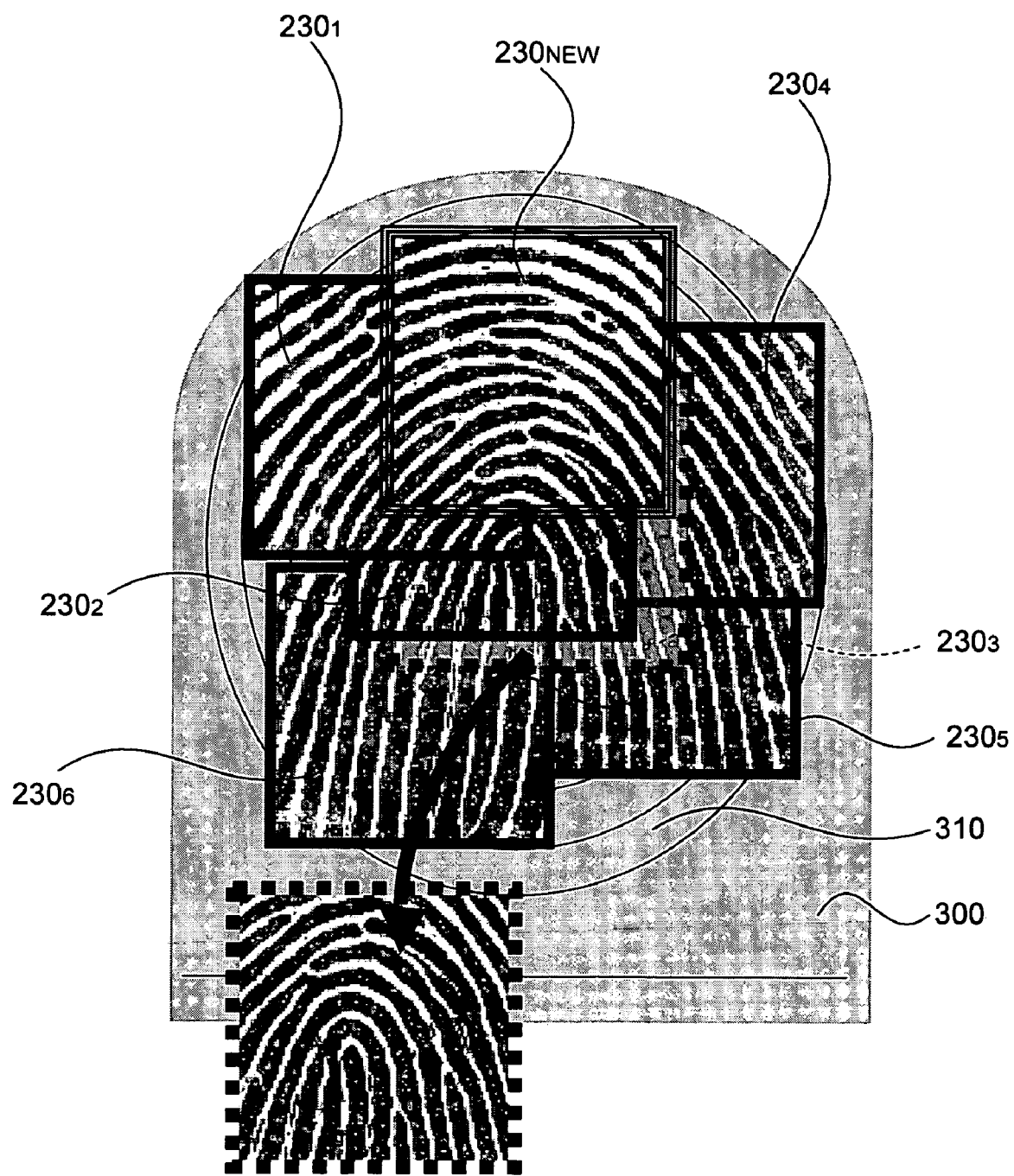
FIG. 9 is a diagram for explaining a fingerprint re-registration process.

For example, as shown in FIG. 9, if a read fingerprint image $230_{NEW}$ read by the image sensor 170 (see FIG. 1 and FIG. 2) matches to a large extent another registered fingerprint image at the position shown in the figure, and if the read fingerprint image $230_{NEW}$ is to be registered, then the range to be covered largely increases as compared with the registered fingerprint image $230_2$.

Therefore, addition of the read fingerprint image $230_{NEW}$ as a registered fingerprint image is useful for improvement of identification performance.

However, there are some problems. One problem is that a fingerprint image of another person may be erroneously registered, and another problem is that the number of registered fingerprint images that can be stored in the RAM 140 is generally limited. The problem of registering another person's fingerprint image may be avoided by using a method of checking the fingerprint image twice, or a method of registering the fingerprint image when the value of matching degree is sufficiently high.

For example, when the value of matching degree of the fingerprint is calculated a threshold value of $\frac{1}{10,000}$ or a threshold value of $\frac{1}{1}$ million may be set as a false acceptance rate.

If the fingerprint identification device is operated based on the false acceptance rate as $\frac{1}{10,000}$, a match is determined in both of the cases. Therefore, only if the false acceptance rate is the threshold value of $\frac{1}{1}$ million in the latter case, the read fingerprint image $230_{NEW}$ is registered.

In this case, chances of erroneous registration of others' fingerprint image can be eliminated almost completely. The problem that the fingerprint cannot be increased unlimitedly can be resolved by deleting an unnecessary registered fingerprint image when a registered fingerprint image is registered.

For example, the whole area of the registered fingerprint image $230_3$ of FIG. 9 overlaps the other registered fingerprint images. In other words, even if the registered fingerprint image $230_3$ is not present, the other registered fingerprint images can substitute it. Therefore, to re-register a new read fingerprint image $230_{NEW}$, any registered fingerprint image (registered fingerprint image 2303 in this case) that can be substituted with other registered fingerprint images is searched for, and is deleted. This allows increase in a range that covers the registered fingerprint images, without increase in the memory capacity of the RAM 140 in which the read fingerprint image 230NEW is registered.

Furthermore, by re-registering a registered fingerprint image, it is also possible to prevent degradation in performance due to a change of a finger with time. For example, if a fingerprint image is registered when a user hurts his/her finger, the finger is getting better with the passage of time. Therefore, when the finger heals, identification may not be carried out properly. By sequentially re-registering registered fingerprint images, it is possible to perform excellent identification at any time according to the change of the finger with the passage of time.

The operation of one embodiment is explained in detail below with reference to flowcharts in FIG. 10 to FIG. 13. At step SA1 of FIG. 10, the CPU 120 (see FIG. 2) of the portable terminal 100 determines whether a user issues a fingerprint registration request for newly registering the registered fingerprint image information group 200 (see FIG. 3) in the RAM 140, and sets the result of determination to "No" in this case.

At step SA2, the CPU 120 determines whether there is a fingerprint identification request, and sets the result of determination to "No" in this case. At step SA3, the CPU 120 determines whether there is a fingerprint re-registration request, and sets the result of determination to "No" in this case. Thereafter, the CPU 120 repeats determinations at step SA1 to step SA3 until it is determined as "Yes" at any of step SA1 to step SA3.

If there is the fingerprint registration request, the CPU 120 sets the result of determination at step SA1 to "Yes". At step SA4, the CPU 120 executes the fingerprint registration process.

Figure 11:
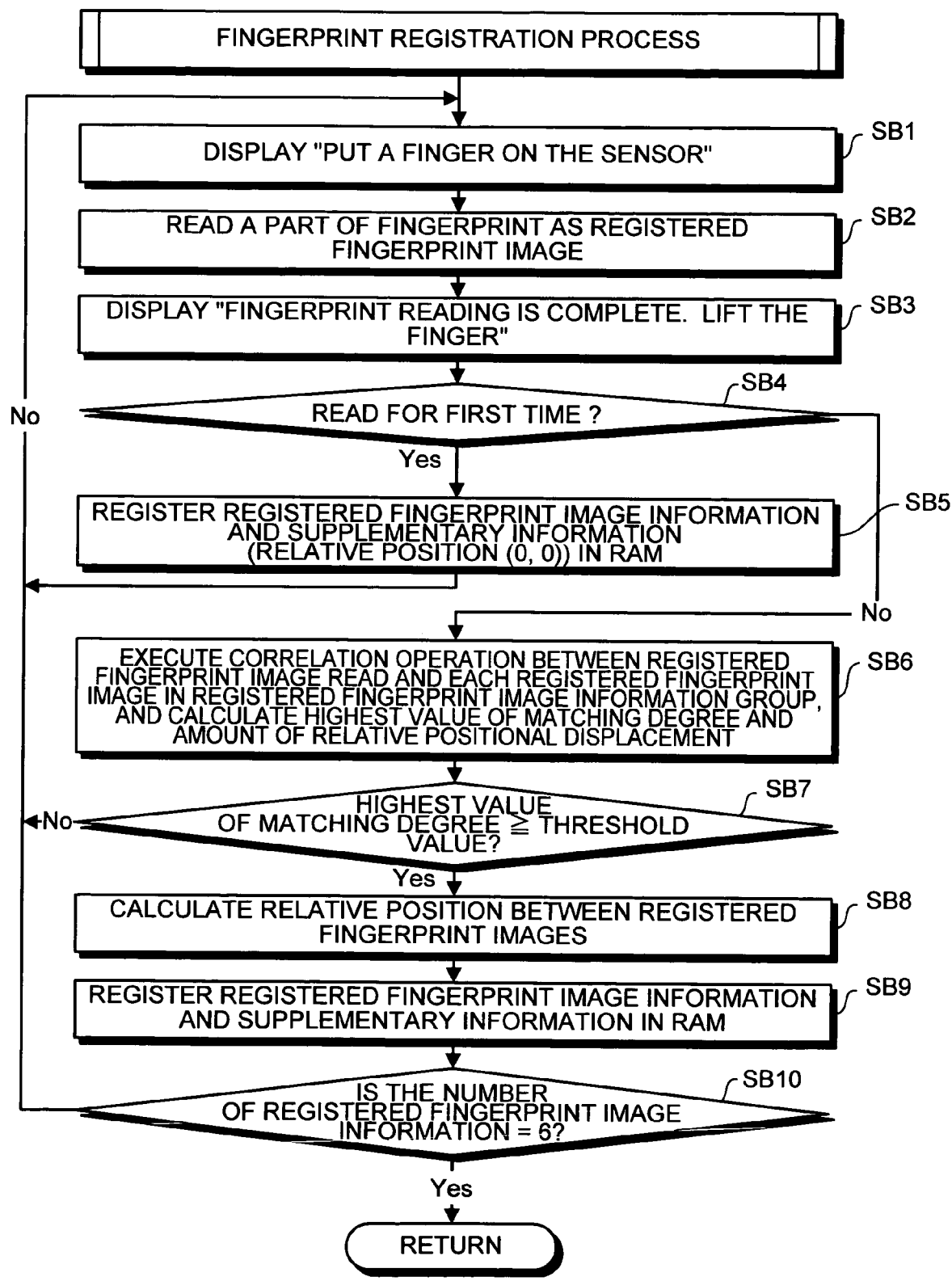
FIG. 11 is a flowchart for explaining a fingerprint registration process shown in FIG. 10.

More specifically, at step SB1 shown in FIG. 11, the CPU 120 causes the display unit 150 to display "Put a finger on the sensor", and prompts the person to be registered to put the finger on the image sensor 170. With this prompt, the person to be registered puts the finger on the image sensor 170.

At step SB2, the image sensor 170 reads a part of the finger of the person to be registered as, for example, the registered fingerprint image $230_1$ of FIG. 4. The registered fingerprint image $230_1$ is a binary image of white and black.

At step SB3, the CPU 120 causes the display unit 150 to display "Fingerprint reading is complete. Lift the finger", and prompts the person to be registered to lift the finger from the image sensor 170. With this prompt, the person to be registered lifts the finger from the image sensor 170.

At step SB4, the CPU 120 determines whether it is the first time that the fingerprint image is read, and sets the result of determination to "Yes" in this case.

At step SB5, the CPU 120 sets a relative position coordinate (XY coordinate system) of the registered fingerprint image $230_1$ of FIG. 4 to (0, 0), and generates the supplementary information $220_1$ in the format shown in FIG. 3 (in this case, registered fingerprint image number=1, relative-position X coordinate=0, relative-position Y coordinate=0, and registered date & time=present date & time). Then, the CPU 120 registers the registered fingerprint image information 210₁ and the supplementary information 220₁ corresponding to the registered fingerprint image 230₁ in the RAM 140.

Next, at step SB1, in the same manner as explained above, the CPU 120 causes the display unit 150 to display "Put a finger on the sensor", and prompts the person to be registered to put the finger on the image sensor 170. With this prompt, the person to be registered puts the finger on the image sensor 170. In this case, because of human errors, a displacement arises between the position in which the finger is put for the first time and the position in which the finger is put for the second time.

At step SB2, the image sensor 170 reads a part of the finger of the person to be registered as, for example, the registered fingerprint image 230₂ of FIG. 4.

At step SB3, the CPU 120 causes the display unit 150 to display "Fingerprint reading is complete. Lift the finger", and prompts the person to be registered to lift the finger from the image sensor 170. With this prompt, the person to be registered lifts the finger from the image sensor 170.

At step SB4, the CPU 120 determines whether it is the first time that the fingerprint image is read, and sets the result of determination to "No" in this case.

At step SB6, the CPU 120 performs a correlation operation (the value of matching degree is calculated based on the matching pattern or the like) between the registered fingerprint image 230₂ read and each of the registered fingerprint images (in this case, only the registered fingerprint image 230₁) in the registered fingerprint image information group 200 (in this case, only the registered fingerprint image information 210₁ and the supplementary information 220₁), and calculates each value of matching degree.

Next, the CPU 120 determines the highest value of matching degree among the values of matching degree, a registered fingerprint image number of a registered fingerprint image corresponding to the highest value of matching degree, and an amount of relative positional displacement (x, y) between the two, and stores these pieces of information in the RAM 140.

At step SB7, the CPU 120 determines whether the highest value of matching degree obtained at step SB6 exceeds a preset threshold value, and sets the result of determination to "Yes" in this case. If the result of determination at step SB7 is "No", the process at step SB1 is executed.

At step SB8, the CPU 120 calculates a relative position between the registered fingerprint image 230₁ (see FIG. 4) having registered fingerprint image number as 1, and the registered fingerprint image 230₂ that corresponds to the highest value of matching degree.

Here, a relative-position X coordinate and a relative-position Y coordinate are calculated from the relative-position X coordinate and the relative-position Y coordinate that correspond to the registered fingerprint image that matches (in this case, registered fingerprint image 230₁), and also from the values of relative positional displacement (x, y). In this case, assuming that the values of the relative-position X coordinate and the relative-position Y coordinate corresponding to the registered fingerprint image 230₁ are set as Xs and Ys, and that the values of relative positional displacement (x, y) are set as Xo and Yo, relative-position X coordinate (Xnew) and Y coordinate (Ynew) are calculated using the following expression (3).

$$Xnew = Xs + Xo, \quad Ynew = Ys + Yo \qquad (3)$$

At step SB9, the CPU 120 generates supplementary information 220₂ (in this case, registered fingerprint image number=2, . . . ) corresponding to the registered fingerprint image 230₂ shown in FIG. 4, and then registers the registered fingerprint image information 210₂ and the supplementary information 220₂ corresponding to the registered fingerprint image 230₂, in the RAM 140.

At step SB10, the CPU 120 determines whether the number of registered fingerprint image information (supplementary information) registered in the RAM 140 is 6 (preset number), and sets the result of determination to "No" in this case. Thereafter, step SB1 to step SB4 and step SB6 to step SB10 are repeated, and the registered fingerprint image information 210₃ to 210₆ (supplementary information 220₃ to 220₆) corresponding to the registered fingerprint images 230₃ to 230₆ of FIG. 4 are sequentially registered in the RAM 140. With this registration, the CPU 120 sets the result of determination at step SB10 to "Yes", and returns to the main routine of FIG. 10. Thus, fingerprint identification is achieved.

Figure 10:
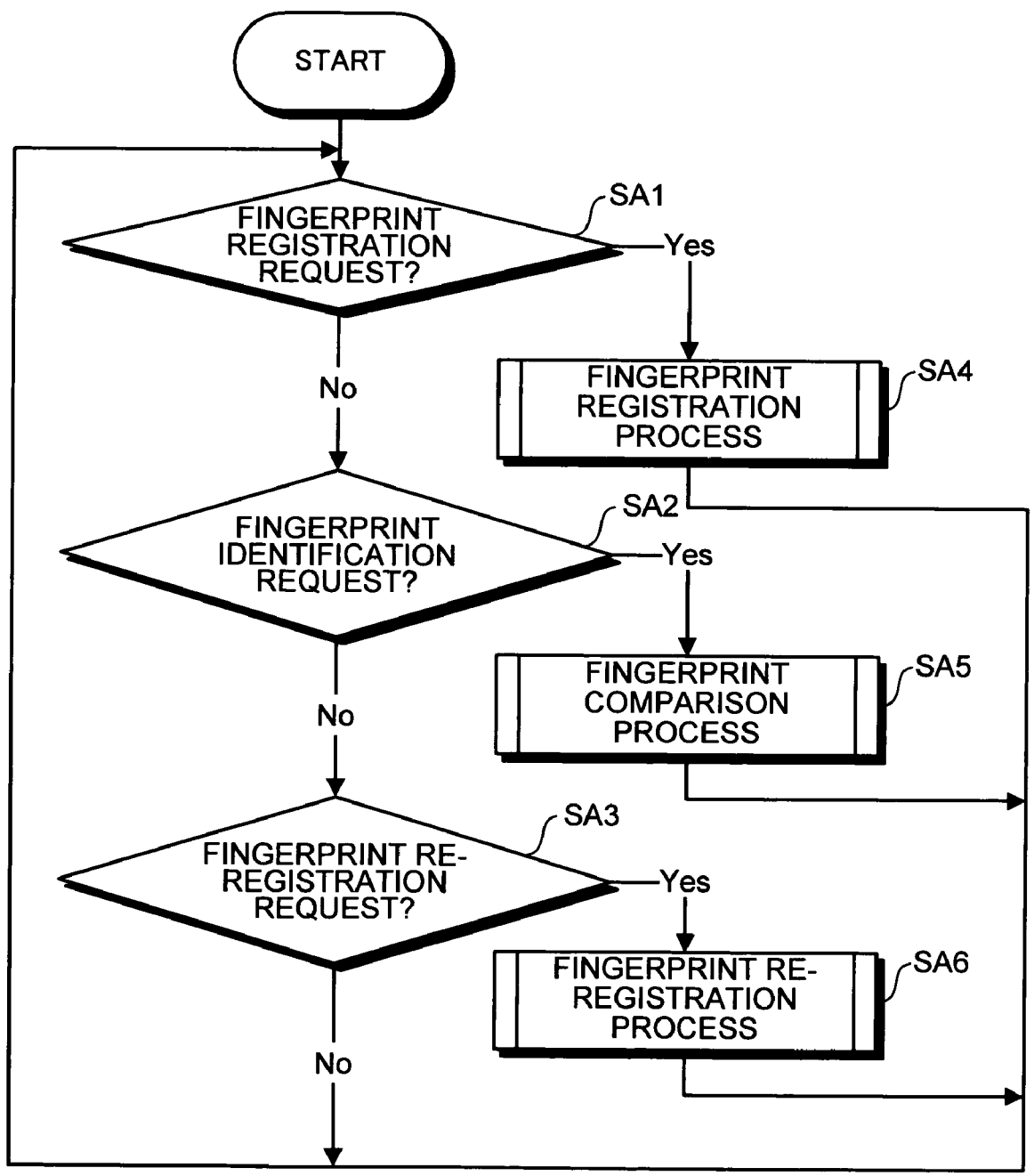
FIG. 10 is a flowchart for explaining an operation of the embodiment.

If the fingerprint identification request is received, the CPU 120 sets the result of determination at step SA2 of FIG. 10 to "Yes". At step SA5, the CPU 120 executes the fingerprint comparison process.

Figure 12:
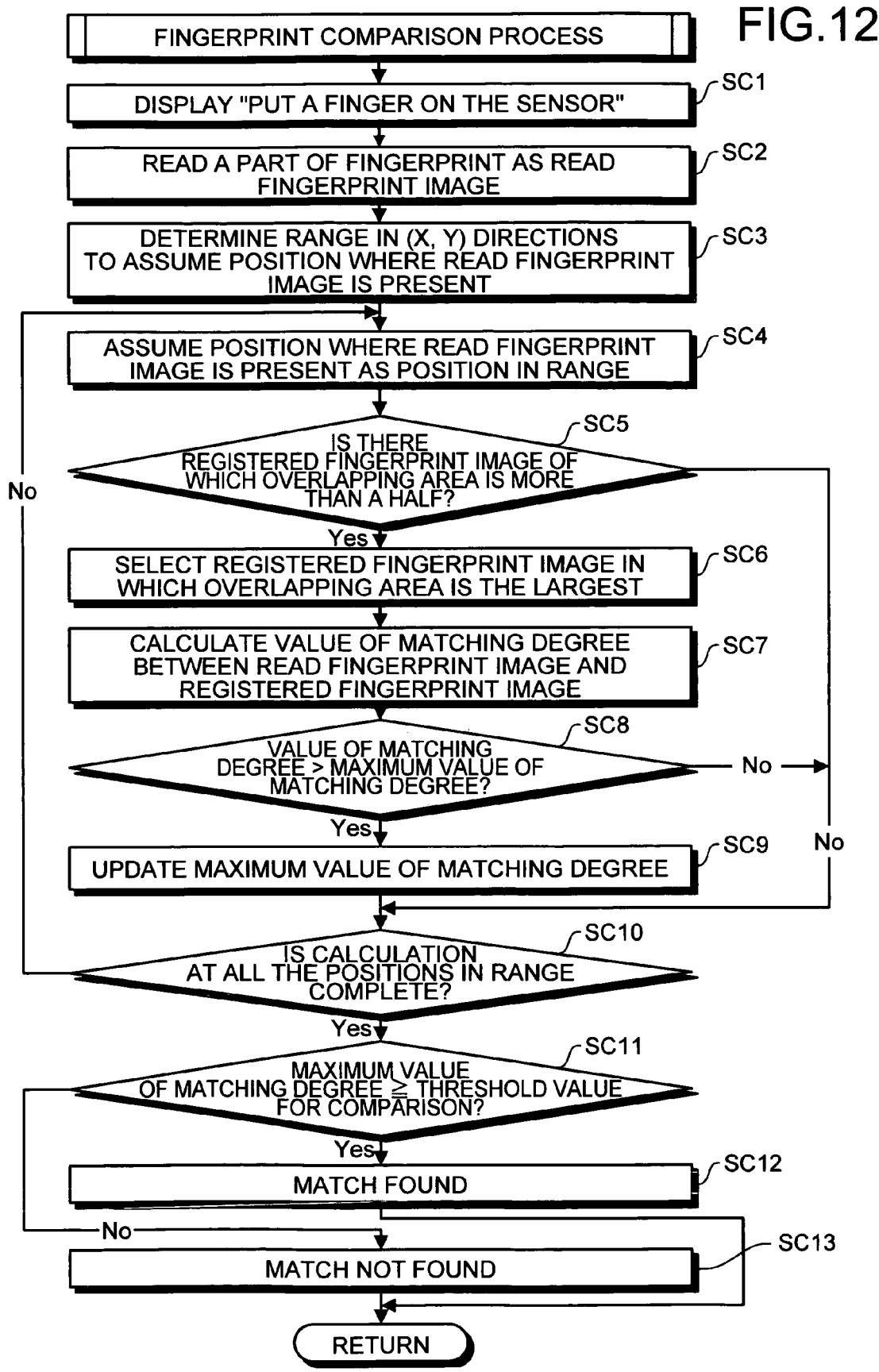
FIG. 12 is a flowchart for explaining a fingerprint comparison process shown in FIG. 10.

More specifically, at step SC1 as shown in FIG. 12, the CPU 120 causes the display unit 150 to display "Put a finger on the sensor", and prompts the person to be identified to put the finger on the image sensor 170. With this prompt, the person to be identified puts the finger on the image sensor 170.

At step SC2, the image sensor 170 reads a part of the finger of the person to be identified as, for example, the read fingerprint image 400 shown in FIG. 5. The read fingerprint image 400 is a binary image of white and black.

At step SC3, the CPU 120 decides a range (X, Y directions) to assume a position where the read fingerprint image 400 is present. More specifically, the X direction is a range from the smallest relative-position X coordinate to the largest relative-position X coordinate, among the six registered fingerprint images shown in FIG. 4. On the other hand, the Y direction is a range from the smallest relative-position Y coordinate to the largest relative-position Y coordinate.

Actually, an area to be covered by the registered fingerprint images does not always cover the whole area of the finger, and therefore, it is appropriate that the area is extended to an area where the area may overlap a half of the finger.

Assume that the smallest relative-position X coordinate is set as Xmin, the largest relative-position X coordinate as Xmax, the smallest relative-position Y coordinate as Ymin, the largest relative-position Y coordinate as Ymax, the size of a fingerprint image is set to have a width XL and a length YL. An assumption range is expressed by the following expression (4).

$$\text{Range in X direction: } Xmin - XL/2 \text{ to } Xmax + XL/2 \qquad (4)$$

$$\text{Range in Y direction: } Ymin - YL/2 \text{ to } Ymax + YL/2$$

The CPU 120 performs calculation on the whole assumption range based on assumption that the read fingerprint image 400 lies within that position.

At step SC4, when deciding a range assumed of the read fingerprint image 400, the CPU 120 further decides one point in the range as a position assumed of the read fingerprint image 400 (coordinates of the point are set as XV, YV).

At step SC5, when assuming that any position of the range is a position in which the read fingerprint image 400 is read, the CPU 120 determines whether there is a registered fingerprint image of which more than half area overlaps the read fingerprint image 400.

Herein, the overlapping area is expressed by the following expression (5) where Xn is a relative-position X coordinate and Yn is a relative-position Y coordinate.

$$|XV-Xn|<XL \text{ and } |YV-Yn|<YL \text{ and} \quad (5)$$

$$(XL-|XV-Xn|)\cdot(YL-|YV-Yn|) \geq (XL\cdot YL)/2$$

If the result of determination at step SC5 is "No", determination is performed at step SC10.

On the other hand, if the result of determination at step SC5 is "Yes", then, at step SC6, the CPU 120 calculates the overlapping area using the following expression (6), and selects a registered fingerprint image in which the overlapping area S is the largest.

$$S=(XL-|XV-Xn|)\cdot(YL-|YV-Yn|) \quad (6)$$

At step SC7, the CPU 120 calculates a value of matching degree between the registered fingerprint image selected at step SC6 and the read fingerprint image 400. More specifically, assuming the relative-position X coordinate and the relative-position Y coordinate of the registered fingerprint image selected are XS and YS, respectively, the value V of matching degree is expressed by the following expression (7).

$X_{sml}$ is the larger of XS and XV, XIar is obtained by adding XL to the smaller of XS and XV, $Y_{sml}$ is the larger of YS and YV, and YIar is obtained by adding YL to the smaller of YS and YV. Further, I(x, y) is a pixel value at a lower position by the coordinates x, y, from the left upper side of the read fingerprint image 400, and T(x, y) is a pixel value at a lower position by the coordinates x, y, from the left upper side of the registered fingerprint image selected.

$$V = \frac{1}{(Xlar-Xsml)\bullet(Ylar-Ysml)} \quad (7)$$

$$\sum_{j=Ysml}^{Ylar} \sum_{i=Xsml}^{Xlar} \text{not}(I(i-XV, j-YV) \text{xor} T(i-XS, j-YS))$$

At step SC8, the CPU 120 determines whether the value V of matching degree calculated at step SC7 exceeds the largest value among the values of matching degree in all the positions assumed so far, i.e., whether the value V exceeds the maximum value Vmax of matching degree. If the result of determination is "No", determination is performed at step SC10.

On the other hand, if the result of determination at step SC8 is "Yes", at step SC9, the CPU 120 substitutes the value V of matching degree in the maximum value Vmax of matching degree, to update the maximum value Vmax of matching degree.

At step SC10, the CPU 120 determines whether values of matching degree are calculated at all the positions in the range of the position assumed of the read fingerprint image 400, sets the result of determination to "No" in this case, and executes the process at the step SC4 and thereafter. Step SC4 to step SC10 are repeated until the result of determination at step SC10 is obtained as "Yes".

If the result of determination at step SC10 is obtained as "Yes", at step SC11, the CPU 120 determines whether the maximum value Vmax of matching degree is equal to or more than the threshold value for comparison, and sets the result of determination to "Yes" in this case. At step SC12, the CPU 120 determines that a match is found, and authorizes that the person to be identified is identified as the person to be registered, and returns to the main routine of FIG. 10.

On the other hand, if the result of determination at step SC11 is "No", at step SC13, the CPU 120 determines that there is no match, determines that the person to be identified is not the person to be registered, and returns to the main routine of FIG. 10.

Upon receiving the fingerprint re-registration request, the CPU 120 sets the result of determination at step SA3 of FIG. 10 to "Yes". At step SA6, the CPU 120 executes a fingerprint re-registration process.

Figure 13:
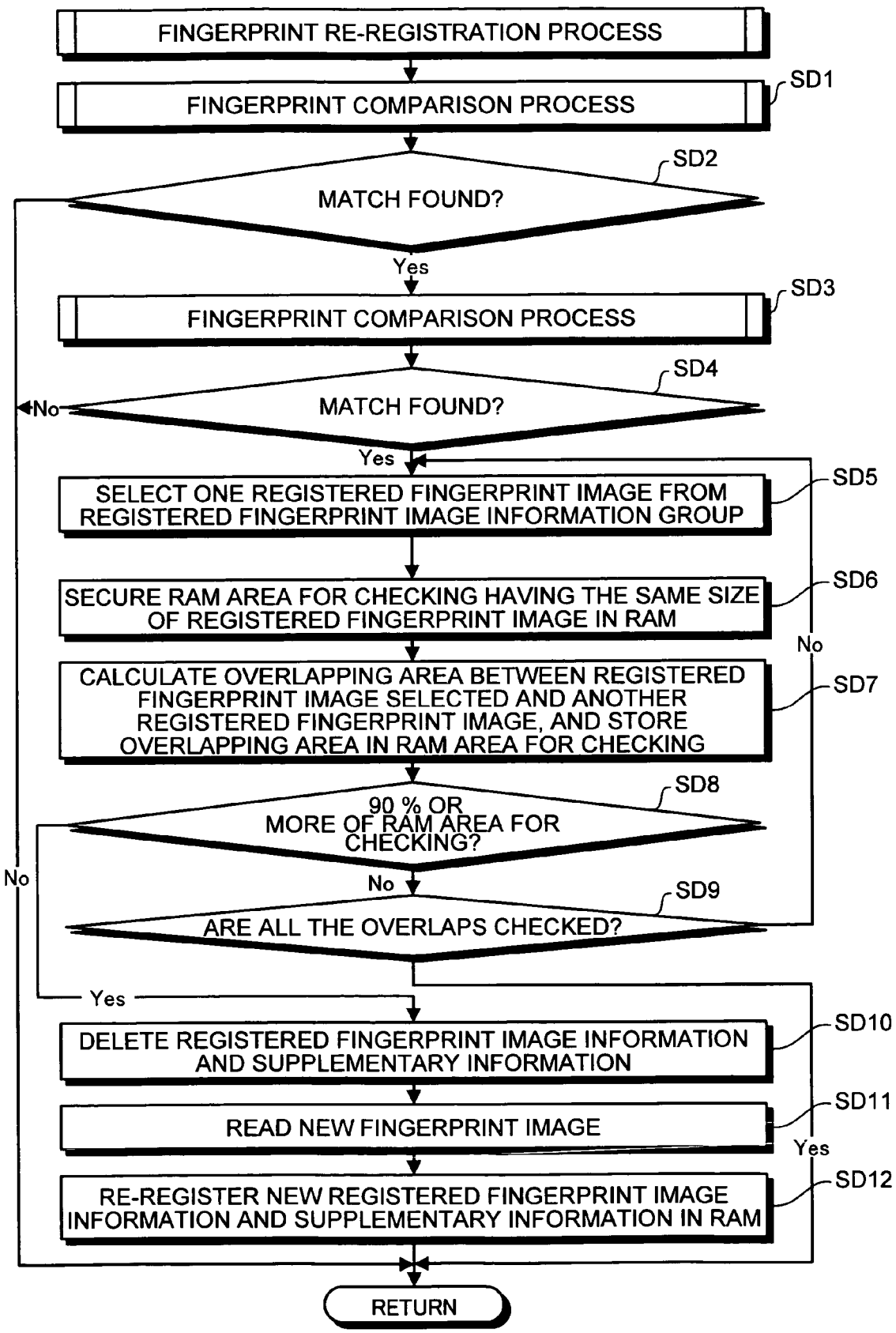
FIG. 13 is a flowchart for explaining a fingerprint re-registration process shown in FIG. 10.

More specifically, at step SD1 as shown in FIG. 13, the CPU 120 executes the fingerprint comparison process (see FIG. 12) a first time. At step SD2, the CPU 120 determines whether a match is found as a result of comparison at step SD1. If the result of determination is "No", the CPU 120 returns to the main routine of FIG. 10.

On the other hand, if the result of determination at step SD2 is "Yes", at step SD3, the CPU 120 executes the fingerprint comparison process (see FIG. 12) a second time. At step SD4, the CPU 120 determines whether a match is found as a result of comparison at step SD3. If the result of determination is "No", the CPU 120 returns to the main routine of FIG. 10. Here, by executing the fingerprint comparison process twice, it is possible to prevent unauthorized use of the device by a malicious third party, and to enhance reliability.

In this case, if the result of determination at step SD4 is "Yes", at step SD5, the CPU 120 selects one registered fingerprint image information (registered fingerprint image) from the registered fingerprint image information group 200 (see FIG. 3). At step SD6, the CPU 120 secures a RAM area for checking, having the same size as the registered fingerprint image information in the RAM 140, and initializes all the values in the RAM area for checking to 0.

At step SD7, the CPU 120 uses the values of the relative position to calculate an overlapping area between the registered fingerprint image selected at step SD5 and another registered fingerprint image, and stores the value of 1 in a portion corresponding to the position of the overlapping area in the RAM area for checking.

At step SD8, the CPU 120 determines whether the value of 1 is stored in 90% or more of the RAM area for checking, and sets the result of determination to "No" in this case. At step SD9, the CPU 120 determines whether all the overlaps are checked, sets the result of determination to "No" in this case, and executes the process at step SD5 and thereafter.

If the result of determination at step SD9 is "Yes", the CPU 120 returns to the main routine of FIG. 10.

If the result of determination at step SD8 is "Yes", at step SD10, the CPU 120 deletes the relevant registered fingerprint image information and the supplementary information from the registered fingerprint image information group 200. At step SD11, the CPU 120 causes the image sensor 170 to read a new fingerprint image in the same manner as explained above. At step SD12, the CPU 120 re-registers in the RAM 140, new registered fingerprint image information and supplementary information that correspond to the fingerprint image, as the registered fingerprint image information group 200.

According to the embodiment explained above, registered fingerprint images of the parts of one finger of a person to be registered are registered as the registered fingerprint image information group 200. One registered fingerprint image is selected from a plurality of registered fingerprint images based on relative positions of the registered fingerprint images, to perform fingerprint identification based on a matching degree between the one registered fingerprint image and the read fingerprint image. Therefore, the present invention can be installed in a portable terminal having such a small-sized image sensor that reads only a part of the fingerprint of a finger, and hence, can achieve highly accurate fingerprint identification. Moreover, in the embodiment, the speed can be prevented from slowing.

Although one embodiment of the present invention has been explained in detail with reference to the drawings, examples of specific configurations are not limited to the above embodiment. Therefore, it is understood that changes and modifications in design may be made in the present invention without departing from the spirit and scope thereof.

For example, in the above embodiment, a method of deciding which registered fingerprint image is to be deleted upon re-registration, may be changed as follows.

That is, a function may be provided to store a date & time related to each registered fingerprint image. The function stores a date & time at fingerprint identification in a part where a particular date & time of a registered fingerprint image is stored. The particular date & time is the one when the highest value of matching degree about the registered fingerprint image is obtained, at the time of the fingerprint identification.

If any new read fingerprint image to be registered comes up, the date & time related to all the registered fingerprint images are referred to. The registered fingerprint image that is dated about one month or more ago is deleted, and a new fingerprint image is re-registered. In many cases, the registered fingerprint image dated one month or more ago is not used, because there is a problem that a part of the fingerprint image may be distorted or missing.

Registration of such a fingerprint image does not contribute to improvement of identification performance. Therefore, the fingerprint image is deleted, and a new fingerprint image is re-registered, to improve the identification performance.

Furthermore, in the embodiment, if the value of matching degree adequate for re-registration of a fingerprint is obtained when fingerprint identification is performed, the date & time on which the fingerprint image is last re-registered is compared with the current date & time. If a difference between the two dates is about six months or more, all pieces of the registered fingerprint image information registered in the RAM 140 are deleted, and the person to be identified is made to re-register fingerprint images until the number of registered fingerprint images reaches a specific number of images. Based on this, all the old fingerprint images are deleted, and new fingerprint images can be re-registered, thereby improving identification performance. In this case, the registered fingerprint image is updated according to a change of a finger with the passage of time, which allows fingerprint identification with high accuracy at any time.

As explained above, the present invention can be installed even in a portable terminal having a small-sized image sensor that can read only a part of the fingerprint of a finger, and can achieve highly accurate fingerprint identification.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fingerprint identification device comprising:
an image acquiring unit configured to acquire a plurality of registered fingerprint images corresponding to different overlapping portions of a registered fingerprint by reading the fingerprint a plurality of times, the registered fingerprint images including a first registered fingerprint, and to acquire a read fingerprint image of a portion of a user's fingerprint;
a relative position calculating unit that calculates a relative coordinate point of each registered fingerprint image relative to a coordinate point of the first registered fingerprint image, and defines an authenticating area used for authentication broader than an area of the registered fingerprint covered by the registered fingerprint images;
a matching degree calculating unit configured to:
compare the read fingerprint image with a corresponding area of the authenticating area at every coordinate point of the authenticating area,
select a most broadly overlapping registered fingerprint image that most broadly overlaps the read fingerprint image if there is any registered fingerprint image that overlaps with at least half of an area of the read fingerprint image, at every coordinate point of the authenticating area, and
calculate a matching degree between the read fingerprint image and each most broadly overlapping registered fingerprint image; and
an authenticating unit that authenticates the read fingerprint image if a maximum of the matching degrees calculated is equal to or greater than a predetermined value.

2. The fingerprint identification device according to claim 1 further comprising:
a registering unit configured to register the registered fingerprint images, wherein
the registering unit does not register a fingerprint image, if an overlapping area between the fingerprint image and a registered fingerprint image that is already registered, is less than a predetermined amount.

3. The fingerprint identification device according to claim 1, further comprising:
a re-registering unit that re-registers a new registered fingerprint image, and from among the registered fingerprint images, deletes a registered fingerprint image of which, an overlapping area with another registered fingerprint image is not less than a predetermined amount.

4. The fingerprint identification device according to claim 3, wherein the re-registering unit re-registers a new registered fingerprint image, and from among the registered fingerprint images, deletes a registered fingerprint image that has been least used for identifying the read fingerprint image within a past predetermined period.

5. The fingerprint identification device according to claim 3, wherein the re-registering unit re-registers a plurality of new registered fingerprint images, and deletes all the registered fingerprint images if at least a predetermined period has passed after a date and time on which the registered fingerprint images are registered.

6. The fingerprint identification device according to claim 3, wherein the re-registering unit performs the re-registration only if matches are found upon executing the fingerprint identification a plurality of times.

7. A method of fingerprint identification comprising:
acquiring a plurality of registered fingerprint images corresponding to different overlapping portions of a registered fingerprint by reading the fingerprint a plurality of times, the registered fingerprint images including a first registered fingerprint acquiring a read fingerprint image of a portion of a user's fingerprint;
calculating a relative coordinate point of each registered fingerprint image relative to a coordinate point of the first registered fingerprint image;
defining an authenticating area used for authentication broader than an area of the registered fingerprint covered by the registered fingerprint images:
comparing the read fingerprint image with a corresponding area of the authenticating area at every coordinate point of the authenticating area,
selecting a most broadly overlapping registered fingerprint image that most broadly overlaps the read fingerprint image if there is any registered fingerprint image that overlaps with at least half of an area of the read fingerprint image, at every coordinate point of the authenticating area, and
calculating a matching degree between the read fingerprint image and each most broadly overlapping registered fingerprint image; and
authenticating the read fingerprint image if a maximum of the matching degrees calculated is egual to or greater than a predetermined value.

8. A computer-readable recording medium that records thereon a computer program including instructions which, when executed, cause a computer to execute:
acquiring a plurality of registered fingerprint images corresponding to different overlapping portions of a registered fingerprint by reading the fingerprint a plurality of times, the registered fingerprint images including a first registered fingerprint acquiring a read fingerprint image of a portion of a user' fingerprint;
calculating a relative coordinate point of each registered fingerprint image relative to a coordinate point of the first registered fingerprint image;
defining a authenticating area used for authentication broader than an area of the registered fingerprint covered by the registered fingerprint images;
comparing the read fingerprint image with a corresponding area of the authenticating area at every coordinate point of the authenticating area,
selecting a most broadly overlapping registered fingerprint image that most broadly overlaps the read fingerprint image if there is any registered fingerprint image that overlaps with at least half of an area of the read fingerprint image, at every coordinate point of the authentication area, and
calculating a matching degree between the read fingerprint image and each most broadly overlapping registered fingerprint image; and
authenticating the read fingerprint image if a maximum of the matching degrees calculated is equal to or greater than a predetermined value.

9. The method of fingerprint identification of claim 7, further comprising:
determining whether it is the first time that a fingerprint of a finger is read.

10. The method of fingerprint identification of claim 9, further comprising:
registering the fingerprint where it is the first time that the fingerprint of the finger is read.

* * * * *

UNITED STATES PATENT AND TRADEMARK OFFICE
CERTIFICATE OF CORRECTION

PATENT NO. : 7,359,534 B2  Page 1 of 1
APPLICATION NO. : 11/109765
DATED : April 15, 2008
INVENTOR(S) : Satoshi Semba et al.

It is certified that error appears in the above-identified patent and that said Letters Patent is hereby corrected as shown below:

Column 12, Line 36, change "1" to --1,--.

Column 13, Line 13, change "images:" to --images;--.

Column 13, Line 27, change "egual" to --equal--.

Column 14, Line 3, change "user'fingerprint" to --user's fingerprint;--.

Column 14, Line 7, change "a" to --an--.

Column 14, Line 18, change "authentication" to --authenticating--.

Signed and Sealed this

Second Day of September, 2008

JON W. DUDAS
*Director of the United States Patent and Trademark Office*